United States Patent
Wu

(10) Patent No.: US 11,178,715 B2
(45) Date of Patent: Nov. 16, 2021

(54) RADIO RESOURCE CONTROL CONNECTION REESTABLISHMENT

(71) Applicant: Google LLC, Mountain View, CA (US)

(72) Inventor: Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/531,597

(22) Filed: Aug. 5, 2019

(65) Prior Publication Data

US 2020/0053812 A1 Feb. 13, 2020

Related U.S. Application Data

(60) Provisional application No. 62/715,767, filed on Aug. 7, 2018.

(51) Int. Cl.
*H04W 76/19* (2018.01)
*H04W 76/27* (2018.01)
*H04W 76/30* (2018.01)
*H04W 76/18* (2018.01)
*H04W 24/10* (2009.01)

(52) U.S. Cl.
CPC ........... *H04W 76/19* (2018.02); *H04W 24/10* (2013.01); *H04W 76/18* (2018.02); *H04W 76/27* (2018.02); *H04W 76/30* (2018.02)

(58) Field of Classification Search
CPC . H04W 24/04; H04W 24/10; H04W 36/0079; H04W 36/0085; H04W 76/18; H04W 76/19; H04W 76/27; H04W 76/30
See application file for complete search history.

(56) References Cited

U.S. PATENT DOCUMENTS

| | | | |
|---|---|---|---|
| 8,369,286 B2 | 2/2013 | Hamabe et al. | |
| 2010/0130205 A1 | 5/2010 | Jung et al. | |
| 2016/0255552 A1* | 9/2016 | Uchino | H04B 7/024 370/329 |
| 2017/0055314 A1* | 2/2017 | Cha | H04W 72/085 |
| 2017/0078872 A1* | 3/2017 | Liao | H04W 8/18 |
| 2019/0223073 A1* | 7/2019 | Chen | H04W 76/18 |
| 2019/0364462 A1* | 11/2019 | Kim | H04W 36/00 |

* cited by examiner

*Primary Examiner* — Khoa Huynh
(74) *Attorney, Agent, or Firm* — Colby Nipper PLLC

(57) ABSTRACT

This document describes methods, devices, systems, and means for radio resource control connection reestablishment, in which a user equipment (110) receives a first measurement configuration (405) from a base station (121), and based on the first measurement configuration, the user equipment (110) performs a first measurement process (415). The user equipment (110) detects a first failure (420) with the base station (121) and in response to detecting the first failure with the base station (121), the user equipment (110) maintains the first measurement configuration and suspends performance of the first measurement process.

23 Claims, 14 Drawing Sheets

RADIO RESOURCE CONTROL CONNECTION REESTABLISHMENT

RELATED APPLICATION

This application claims priority under 35 U.S.C. § 119(e) to U.S. Provisional Patent Application 62/715,767, filed on Aug. 7, 2018, which is incorporated herein by reference in its entirety.

BACKGROUND

The evolution of wireless communication to fifth generation (5G) standards and technologies provides higher data rates and greater capacity with improved reliability and lower latency that enhances mobile broadband services. 5G technologies also provide new classes of service for vehicular networking, fixed wireless broadband, and the Internet of Things (IoT).

Managing user equipment mobility in cellular networks depends on the measurements of wireless communication links by user equipments to provide base stations and core network functions measurement results to manage mobility-related processes, such as handovers. However, there are failure modes of wireless communications and signaling that can leave a user equipment in a state of performing measurements that may not be received by a base station resulting in wasted consumption of resources (e.g., battery capacity) by the user equipment or transmitting measurement reports that interfere with reestablishing Radio Resource Control connections.

SUMMARY

This summary is provided to introduce simplified concepts of radio resource control connection reestablishment. The simplified concepts are further described below in the Detailed Description. This summary is not intended to identify essential features of the claimed subject matter nor is it intended for use in determining the scope of the claimed subject matter.

In aspects, methods, devices, systems, and means for radio resource control connection reestablishment are described, in which a user equipment (UE) receives a first measurement configuration from a base station and performs a first measurement process based on the first measurement configuration. The UE detects a first communication failure with the base station, and in response to detecting the first communication failure with the base station, the UE maintains the first measurement configuration and suspends performance of the first measurement process.

In another aspect, methods, devices, systems, and means for radio resource control connection reestablishment are described, in which a user equipment (UE) receives a first measurement configuration from a base station and performs a first measurement process based on the first measurement configuration. Based on a first measurement, the UE transmits a first measurement report to the base station. The UE detects a first communication failure with the base station, and in response to detecting the first communication failure with the base station, the UE suspends transmission of additional measurement reports.

In another aspect, methods, devices, systems, and means for radio resource control connection reestablishment are described, in which a user equipment (UE) receives a first measurement configuration from a base station and performs a first measurement process based on the first measurement configuration. Based on a first measurement, the UE transmits a first measurement report to the base station. The UE detects a first communication failure with the base station, and in response to detecting the first communication failure with the base station, the UE suspends communication with the base station over a first signaling radio bearer and suspends transmission of additional measurement reports.

BRIEF DESCRIPTION OF THE DRAWINGS

Aspects of radio resource control connection reestablishment are described with reference to the following drawings. The same numbers are used throughout the drawings to reference like features and components.

DETAILED DESCRIPTION

Overview

This document describes Radio Resource Control (RRC) connection reestablishment. While features and concepts of the described systems and methods for Radio Resource Control (RRC) connection reestablishment can be implemented in any number of different environments, systems, devices, and/or various configurations, aspects of Radio Resource Control (RRC) connection reestablishment are described in the context of the following example devices, systems, and configurations.

Measurements of wireless communication links between user equipments and base stations provide information for managing connectivity in cellular networks. Base stations and/or core network functions use these measurements to maintain connectivity by determining when to hand over a user equipment from one base station to another, how to configure reception and transmission setting of a user equipment, or the like. Base stations transmit measurement configurations to user equipments in Radio Resource Control (RRC) Reconfiguration messages (e.g., an RRCReconfiguration message) that specify the measurements the user equipment will perform, how frequently to perform or report the measurements, or the like.

While these measurements provide data that is required to manage a cellular network, the measurements require resources of the user equipment to perform the measurement processes and consume network capacity to transmit measurement reports. At times when a failure of the wireless communication link between a user equipment and a base station occurs (e.g., a failure of an RRC control link), the resources consumed by continuing to perform a measurement process and transmit measurement reports can waste resources and hinder reestablishing the wireless communication link. The techniques described herein manage the performance of measurement processes and transmission of measurement reports during RRC connection reestablishment to reduce the time needed for RRC connection reestablishment and reduce the consumption of resources during RRC connection reestablishment.

Example Environment

Figure 1:
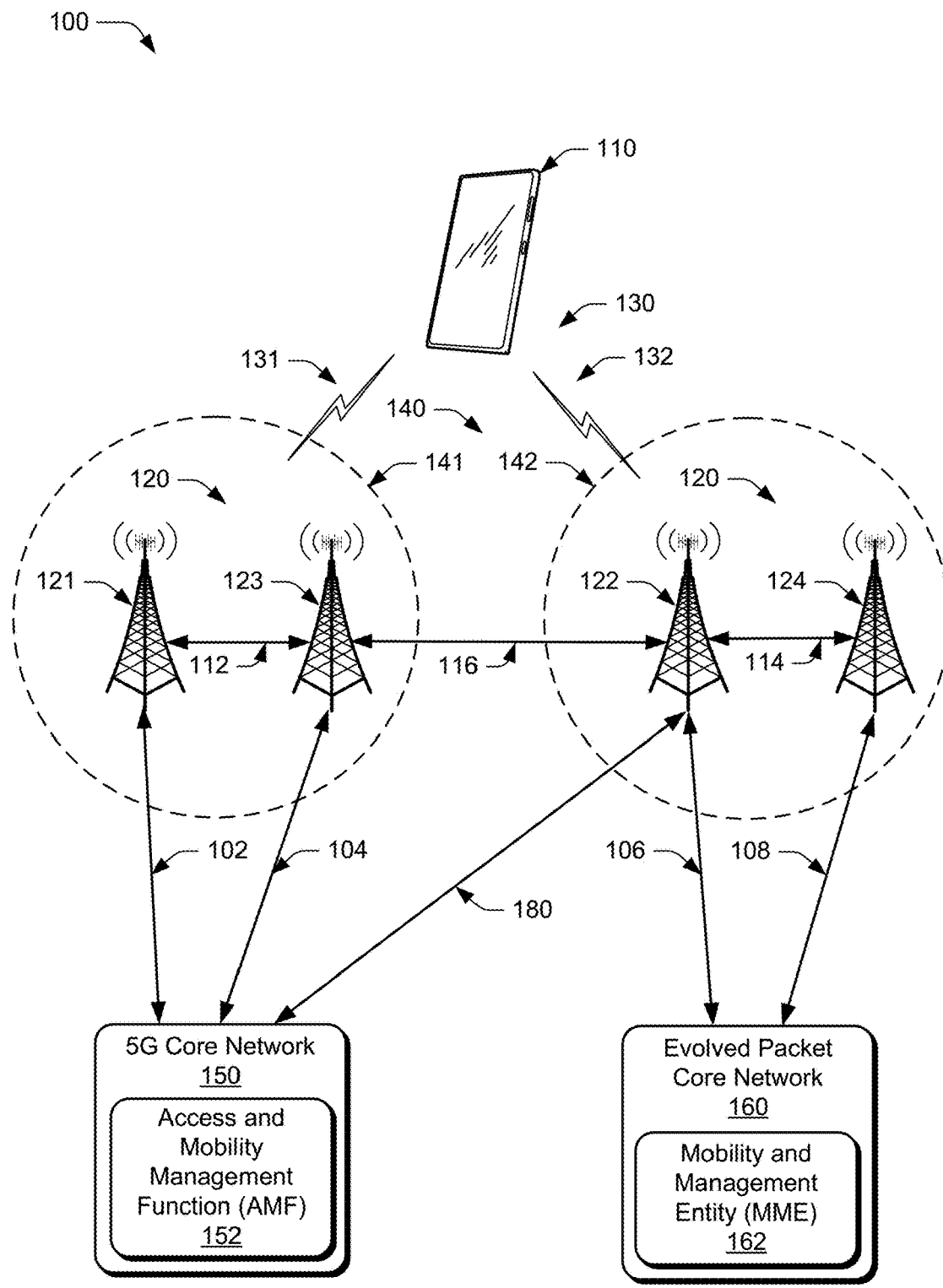
FIG. 1 illustrates an example wireless network environment in which various aspects of radio resource control connection reestablishment can be implemented.

FIG. 1 illustrates an example environment 100, which includes a user equipment 110 (UE 110) that communicates with one or more base stations 120 (illustrated as base stations 121, 122, 123, and 124) through one or more wireless communication links 130 (wireless link 130), illustrated as wireless links 131 and 132. In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 via the wireless links 131 and 132, which may be implemented as any suitable type of wireless link. The wireless link 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

On a periodic or event-based basis, the UE 110 performs a first measurement process as configured by its base station 121. The base station 121 may send measurement configurations to the UE 110 in a Radio Resource Control (RRC) layer message such as an RRC Reconfiguration message (e.g., an RRCReconfiguration message). Frequently, the UE's measurements reflect the received signal quality of the base station 121 and base stations in neighboring cells. Other events or objects may also be measured. The UE 110 sends a measurement report to the base station as configured by the base station 121 in a measurement reporting configuration.

The base stations 120 are collectively a Radio Access Network 140 (RAN, Evolved Universal Terrestrial Radio Access Network, E-UTRAN, 5G NR RAN or NR RAN). The RANs 140 are illustrated as a 5G NR RAN 141 and an E-UTRAN 142. The base stations 121 and 123 in the 5G NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, a base station 122 in the E-UTRAN 142 may connect to the 5GC 150 and EPC 160 networks.

The base stations 121 and 123 connect, at 102 and 104 respectively, to the 5GC 150 via an NG2 interface for control-plane signaling and via an NG3 interface for user-plane data communications. The base stations 122 and 124 connect, at 106 and 108 respectively, to the EPC 160 via an S1 interface for control-plane signaling and user-plane data communications. Optionally or additionally, if the base station 122 connects to the 5GC 150 and EPC 160 networks, the base station 122 connects to the 5GC 150 via an NG2 interface for control-plane signaling and via an NG3 interface for user-plane data communications, at 180.

In addition to connections to core networks, base stations 120 may communicate with each other. The base stations 121 and 123 communicate via an Xn interface at 112. The base stations 122 and 124 communicate via an X2 interface at 114. The base station 122, which is connected to both the 5GC 150 and the EPC 160, may communication with the base stations 121 and/or 123 using the Xn interface, as illustrated at 116.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility and Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110, via the base stations 120.

Example Devices

Figure 2:
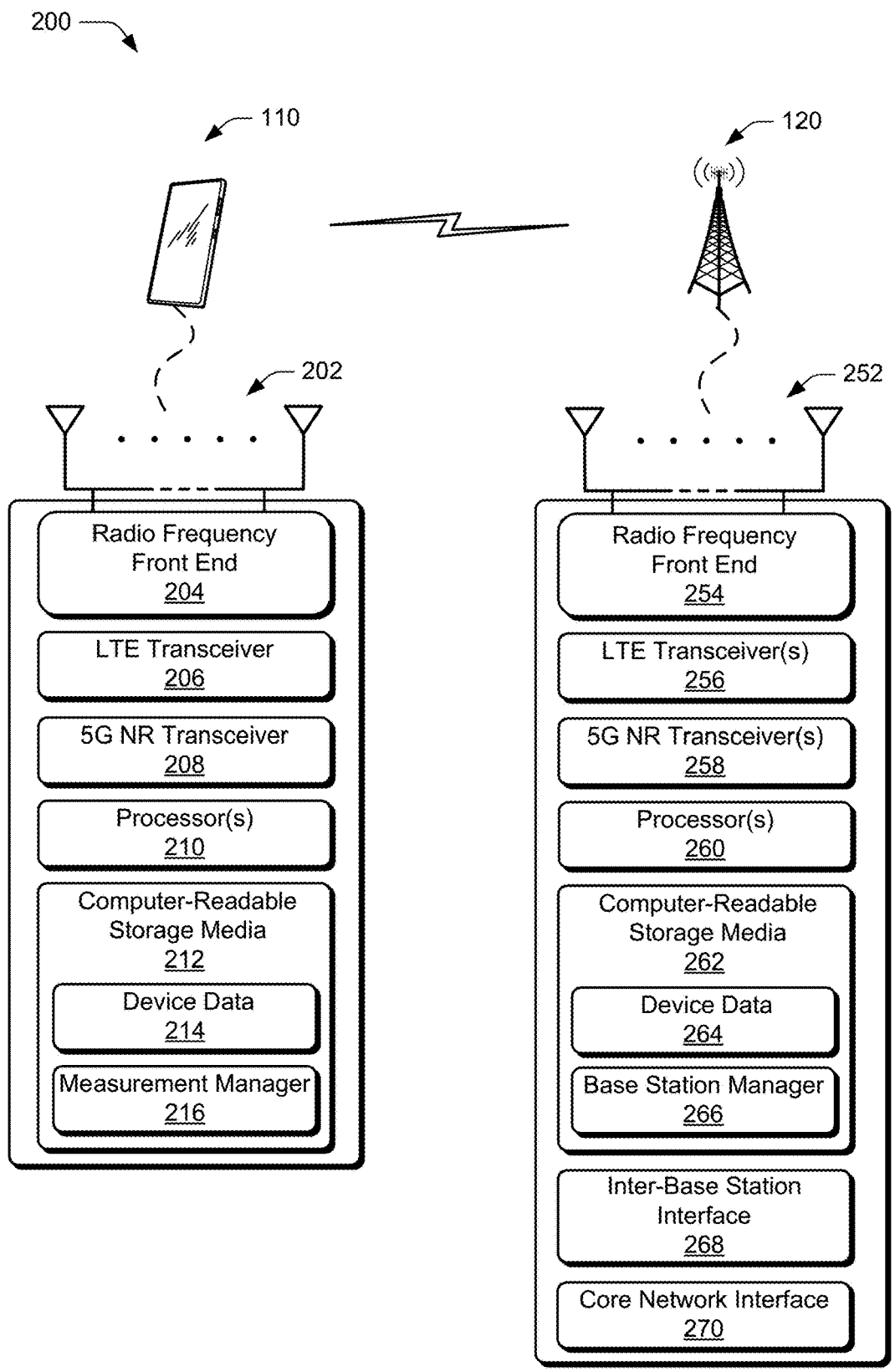
FIG. 2 illustrates an example device diagram for devices that can implement various aspects of radio resource control connection reestablishment.

FIG. 2 illustrates an example device diagram 200 of the UE 110, the base stations 120. The UE 110, the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the 5G RAN 141 and/or the E-UTRAN 142. The RF front end 204 of the UE 110 can couple or connect the LTE transceiver 206, and the 5G NR transceiver 208 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5GNR communication standards and implemented by the LTE transceiver 206, and/or the 5GNR transceiver 208. Additionally, the antennas 202, the RF front end 204, the LTE transceiver 206, and/or the 5GNR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

Measurement configurations from the base station 121, such as those found in an RRC Reconfiguration message including first measurement configuration parameters, may specify the frequencies and cells to measure, which may result in changes to parameters of the antennas 202 or the RF front end 204.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by processor(s) 210 to enable user-plane communication, control-plane signaling, and user interaction with the UE 110.

CRM 212 also includes a measurement manager 216. Alternately or additionally, the measurement manager 216 may be implemented in whole or part as hardware logic or circuitry integrated with or separate from other components of the UE 110. In at least some aspects, the measurement manager 216 configures the RF front end 204, the LTE transceiver 206, and/or the 5G NR transceiver 208 to implement the techniques for radio resource control connection reestablishment described herein.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266. Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

User Plane and Control Plane Signaling

Figure 3:
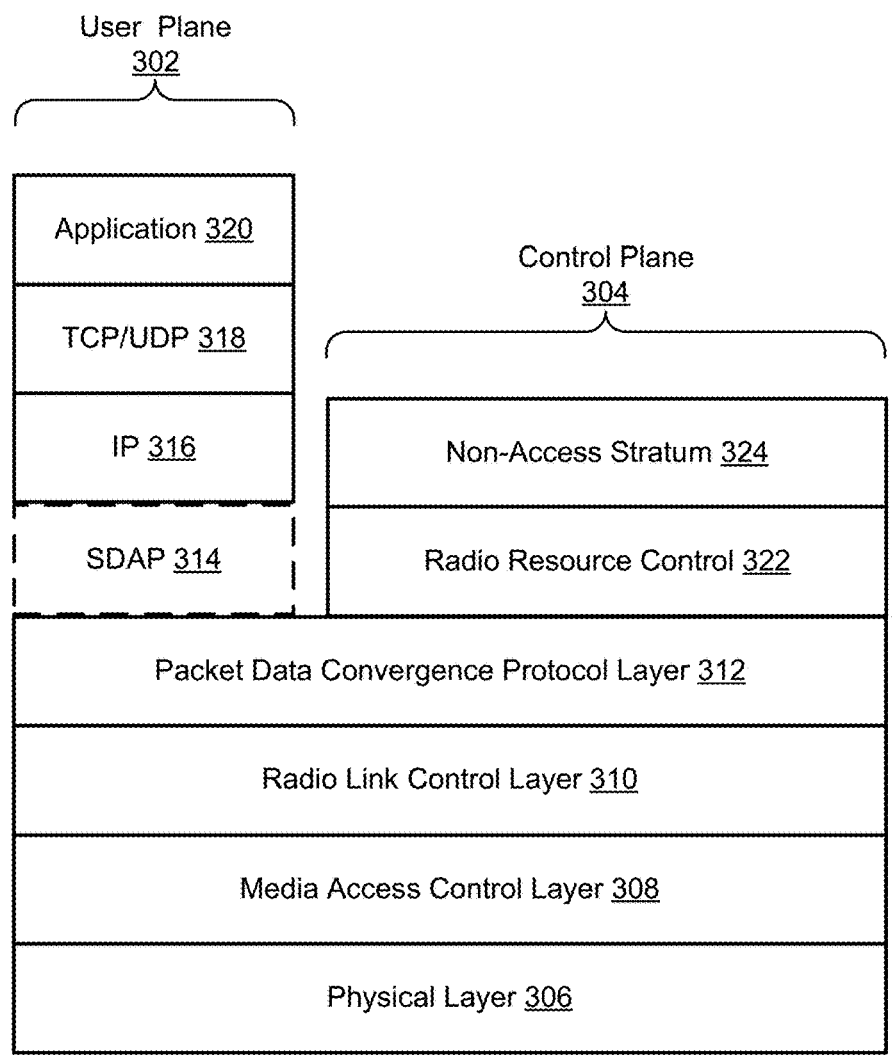
FIG. 3 illustrates an example wireless networking stack with which aspects of radio resource control connection reestablishment can be implemented.
Figure 4:
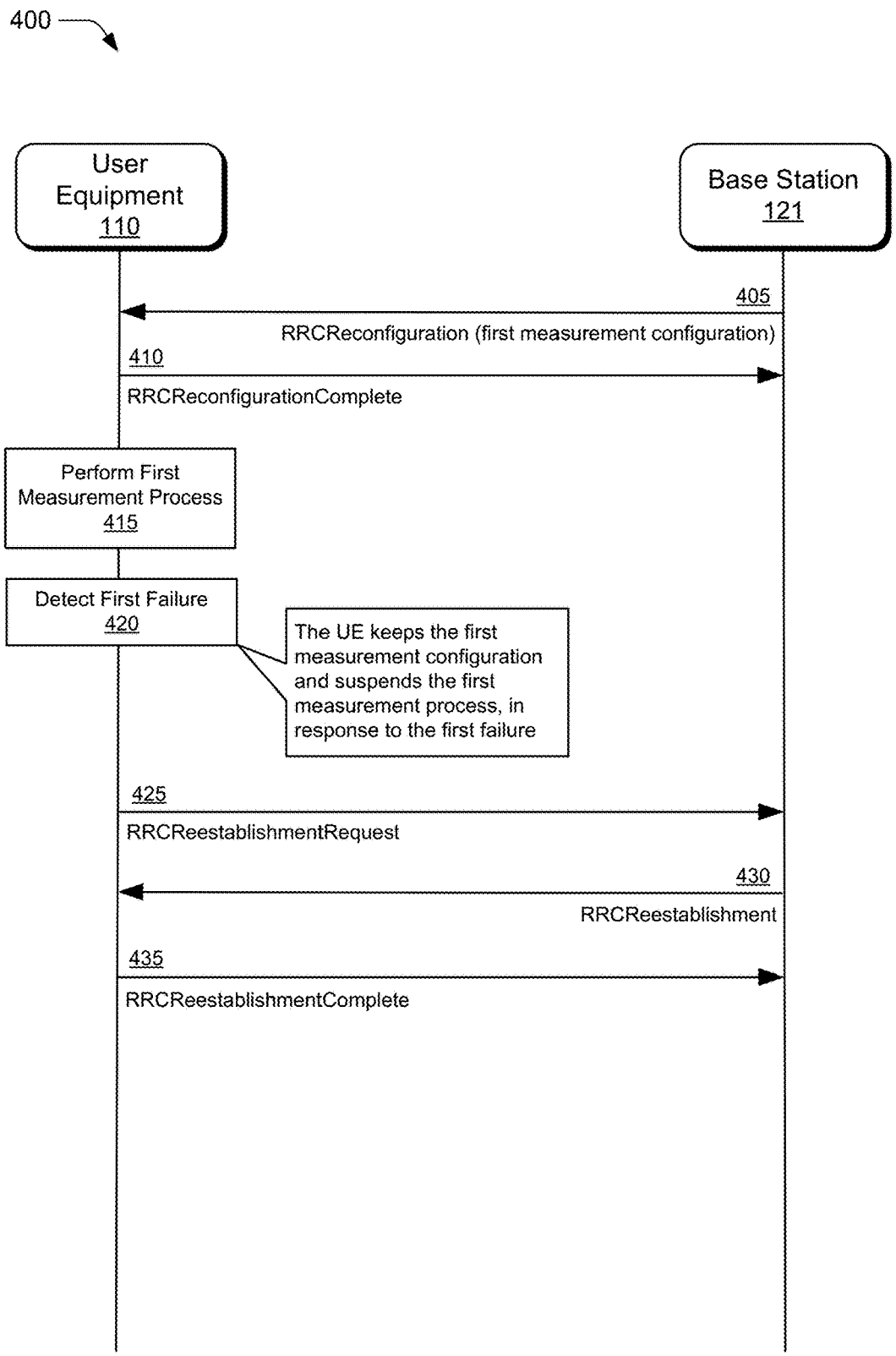
FIG. 4 illustrates example data and control transactions between devices engaged in radio resource control connection reestablishment in accordance with various aspects of the techniques described herein.

FIG. 3 illustrates an example block diagram of a wireless network stack model 300 that characterizes a communication system for the example environment 100, in which various aspects of radio resource control connection reestablishment can be implemented. The wireless network stack 300 includes a user plane 302 and a control plane 304. Upper layers of the user plane 302 and the control plane 304, share common lower layers in the wireless network stack 300. Wireless devices such as the UE 110 or base stations 120 implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical layer 306 (PHY layer 306), a Media Access Control layer 308 (MAC layer 308), a Radio Link Control layer 310 (RLC layer 310), and a Packet Data Convergence Protocol layer 312 (PDCP layer 312). The physical layer 306 provides hardware specifications for devices that communicate with each other. As such, the physical layer 306 establishes how devices connect to each other, assists in managing how communication resources are shared among devices, and the like. The UE's measurements monitor the activity on the physical layer 306, which is a basis for communications through all other layers.

The MAC layer 308 specifies how data is transferred between devices. Generally, the MAC layer 308 provides a way in which data packets being transmitted are encoded and decoded into bits as part of a transmission protocol.

The RLC layer 310 provides data transfer services to higher layers in the wireless network stack 300. Generally, the RLC layer 310 provides error correction, packet segmentation and reassembly, and management of data transfers in various modes, such as acknowledged, unacknowledged, or transparent modes.

The PDCP layer 312 provides data transfer services to higher layers in the wireless network stack 300. Generally, the PDCP layer 312 provides transfer of user plane 302 and control plane 304 data, header compression, ciphering, and integrity protection.

Above the PDCP layer 312, the wireless network stack splits into the user-plane stack 302 and the control-plane stack 304. The user plane 302 layers include an optional Service Data Adaptation Protocol layer 314 (SDAP 314), an Internet Protocol layer 316 (IP 316), a Transmission Control Protocol/User Datagram Protocol layer 318 (TCP/UDP 318), and an application 320 that transfer data via the wireless link 106. The optional SDAP layer 314 is present in 5G NR networks and maps a Quality of Service (QoS) flow for each data radio bearer and marks QoS flow identifiers in uplink and downlink data packets for each packet data session. The IP layer 316 specifies how the data from the application 320 is transferred to a destination node. The TCP/UDP layer 318 is used to verify that data packets intended to be transferred to the destination node reached the destination node, using either TCP or UDP for data transfers by the application 320.

The control plane 304 includes Radio Resource Control 322 (RRC 322) and a Non-Access Stratum 324 (NAS 324). The RRC 322 establishes and releases connections and radio bearers, broadcasts system information, performs power control, and so forth. The NAS 324 provides support for mobility management and packet data bearer contexts between the user equipment 110 and entities or functions in the core network, such as the Access and Mobility Management Function 152 (AMF 152), or the Mobility Management Entity 162 (MME 162), or the like.

In the UE 110, each layer in both the user plane 302 and the control plane 304 of the wireless network stack 300 interacts with a corresponding peer layer or entity in a base station 120, a core network entity or function, and/or a remote service, to support user applications and control operation of the UE 110 in the NR RAN 141 or the E-UTRAN 142.

Radio Resource Control Connection Reestablishment Processes

In the following examples, the term "keep" may be replaced by the term "maintain." For example, the term "keep" describes continuing to operate using a previously applied configuration, such as a UE keeps (or maintains) a measurement configuration for making successive measurements.

FIGS. 4-8 illustrate example data and control transactions between devices engaged in radio resource control connection reestablishment in accordance with various aspects of the techniques described herein. At 405, a UE (e.g., the UE 110) receives a first measurement configuration from a base station (e.g., the base station 121). For example, the UE 110 receives, from base station 121, a first RRC Reconfiguration message (e.g., an RRCReconfiguration message) that includes the first measurement configuration. In response to receiving the first RRCReconfiguration message the UE 110 transmits a first RRC Reconfiguration Complete message (e.g., an RRCReconfigurationComplete message) to the base station 121, at 410. The first measurement configuration may configure a first measurement object to be measured. The first measurement configuration may include a first measurement identity identifying the first measurement configuration. The first measurement configuration may include a measurement reporting configuration.

At 415, the UE 110 performs a first measurement process according to the first measurement configuration. At 420, the UE 110 detects a first communication failure in communications with the base station 121. In response to detecting the first communication failure, the UE 110 keeps (maintains) the first measurement configuration and suspends the first measurement process in response to the first communication failure. In one example, the first communication failure may include a radio link failure, a re-configuration with sync failure, a mobility from 5G NR failure, an integrity check failure, a Radio Resource Control (RRC) connection reconfiguration failure, or the like. When the UE 110 suspends the first measurement process, the UE does not perform the first measurement process and does not send a first measurement report to the base station 121.

In one aspect, the UE 110 initiates a first RRC connection reestablishment procedure in response to the first communication failure, at 425. Alternatively, the UE 110 keeps the first measurement configuration and suspends the first measurement process, in response to sending the first RRC connection reestablishment request message (e.g., an RRCReestablishmentRequest message).

At 430, in response to transmitting the first RRC connection reestablishment request, the UE 110 may receive an RRC Reestablishment message (e.g., an RRCReestablishment message) from the base station 121. At 435, in response to receiving the RRC Reestablishment message, the UE 110 transmits an RRC Reestablishment Complete message (e.g., an RRCReestablishmentComplete message) to the base station 121.

Figure 6:
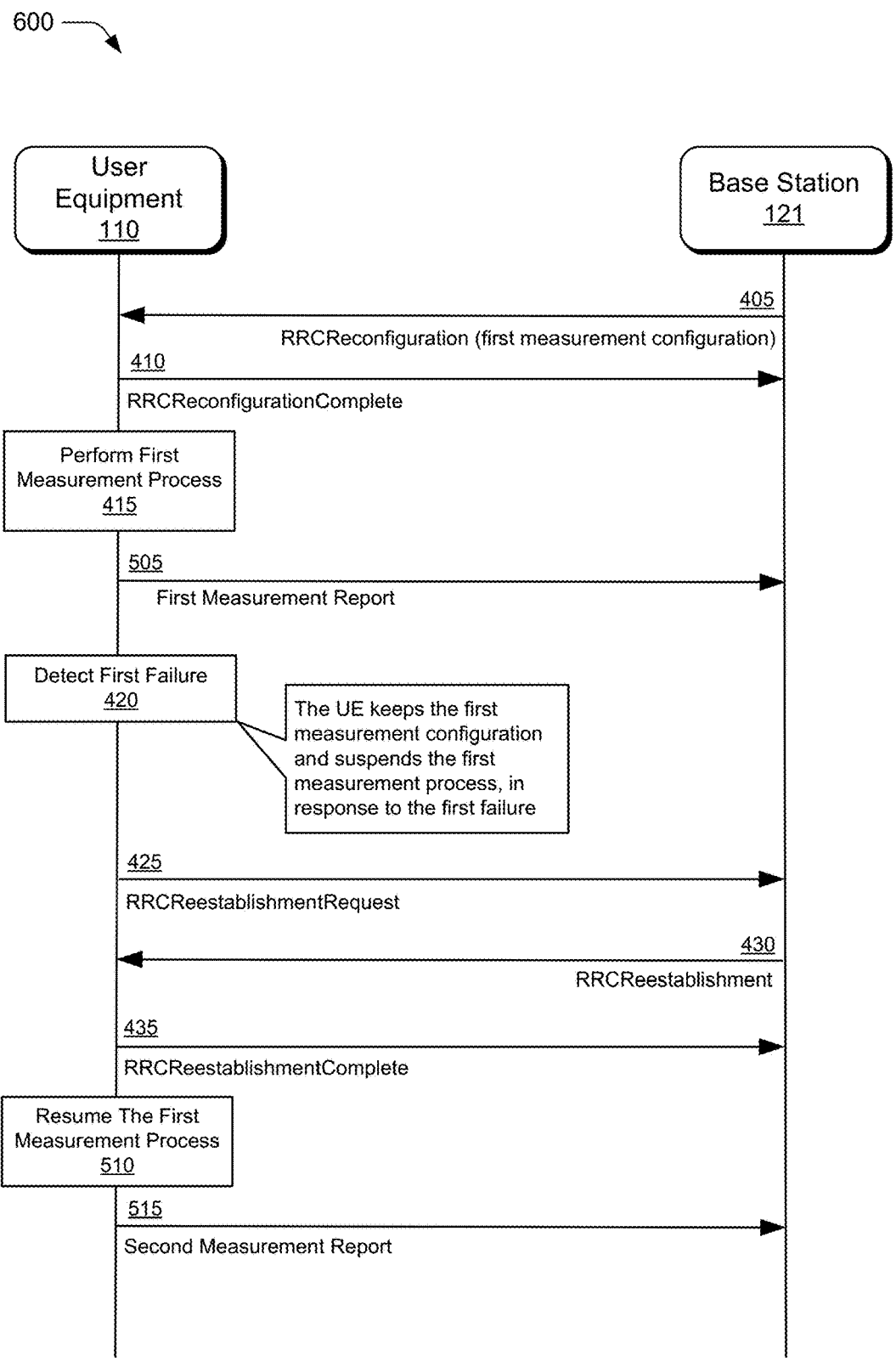
FIG. 6 illustrates example data and control transactions between devices engaged in radio resource control connection reestablishment in accordance with various aspects of the techniques described herein.

In one aspect, the UE resumes the first measurement process in response to/after/when the first communication failure is recovered. For example, if the UE receives the RRC Reestablishment message and performs an integrity check on the RRC Reestablishment message successfully, the UE may consider the first communication failure is recovered. In another example as shown in FIG. 6, the UE may resume the first measurement process after transmitting the RRC Reestablishment Complete message.

Figure 7:
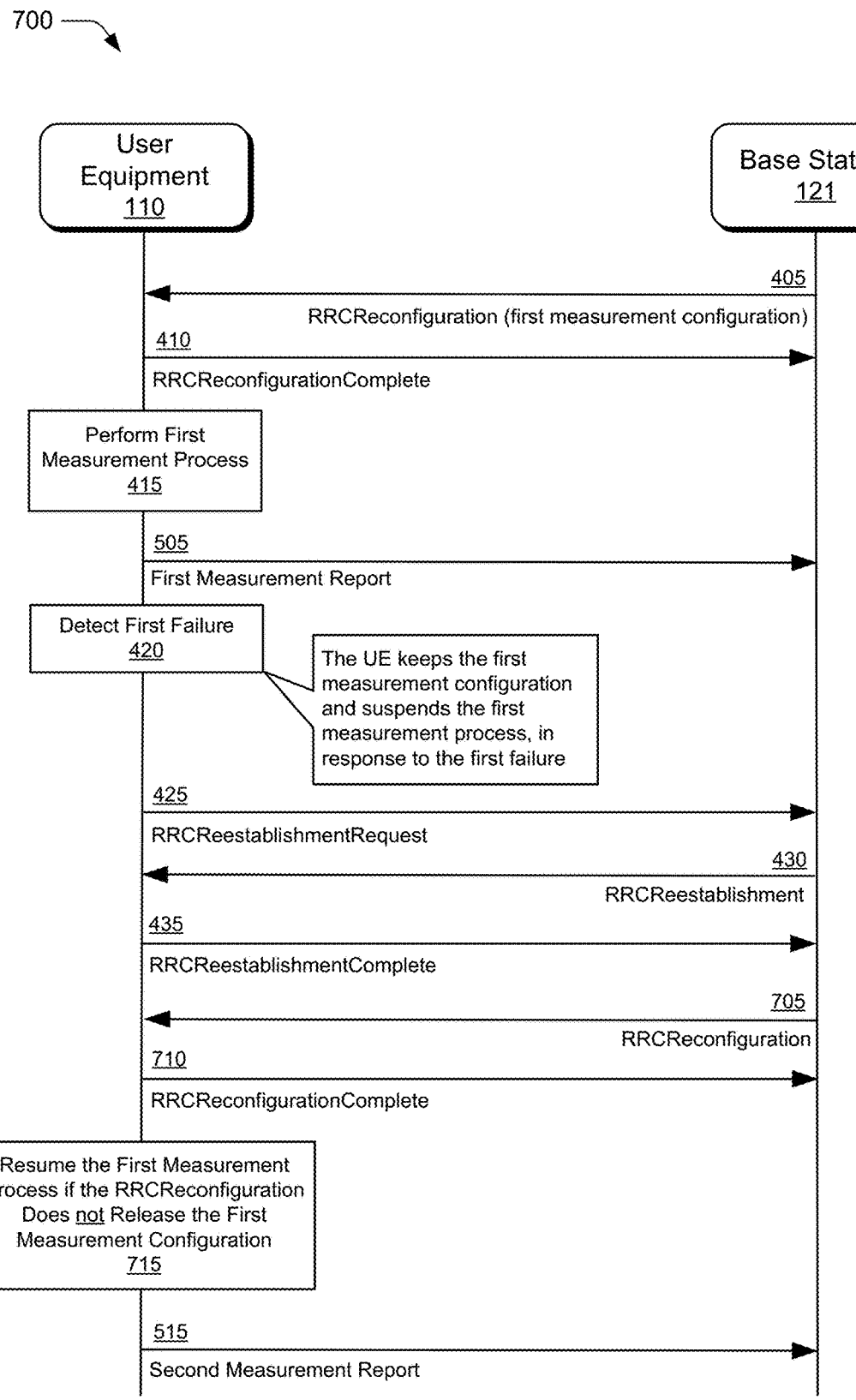
FIG. 7 illustrates example data and control transactions between devices engaged in radio resource control connection reestablishment in accordance with various aspects of the techniques described herein.

In an aspect as shown in FIG. 7, the UE 110 receives, from base station 121, a second RRCReconfiguration message, at 705. In response to receiving the second RRCReconfiguration message the UE 110 transmits a second RRCReconfigurationComplete message to the base station 121 at 710. The UE 110 may determine to resume the first measurement process at 715 if the second RRC Reestablishment message does not configure the UE to release the first measurement configuration. The UE keeps suspending or stops the first measurement process if the second RRC Reestablishment message configures the UE to release the first measurement configuration as shown at 805 in FIG. 8.

Figure 8:
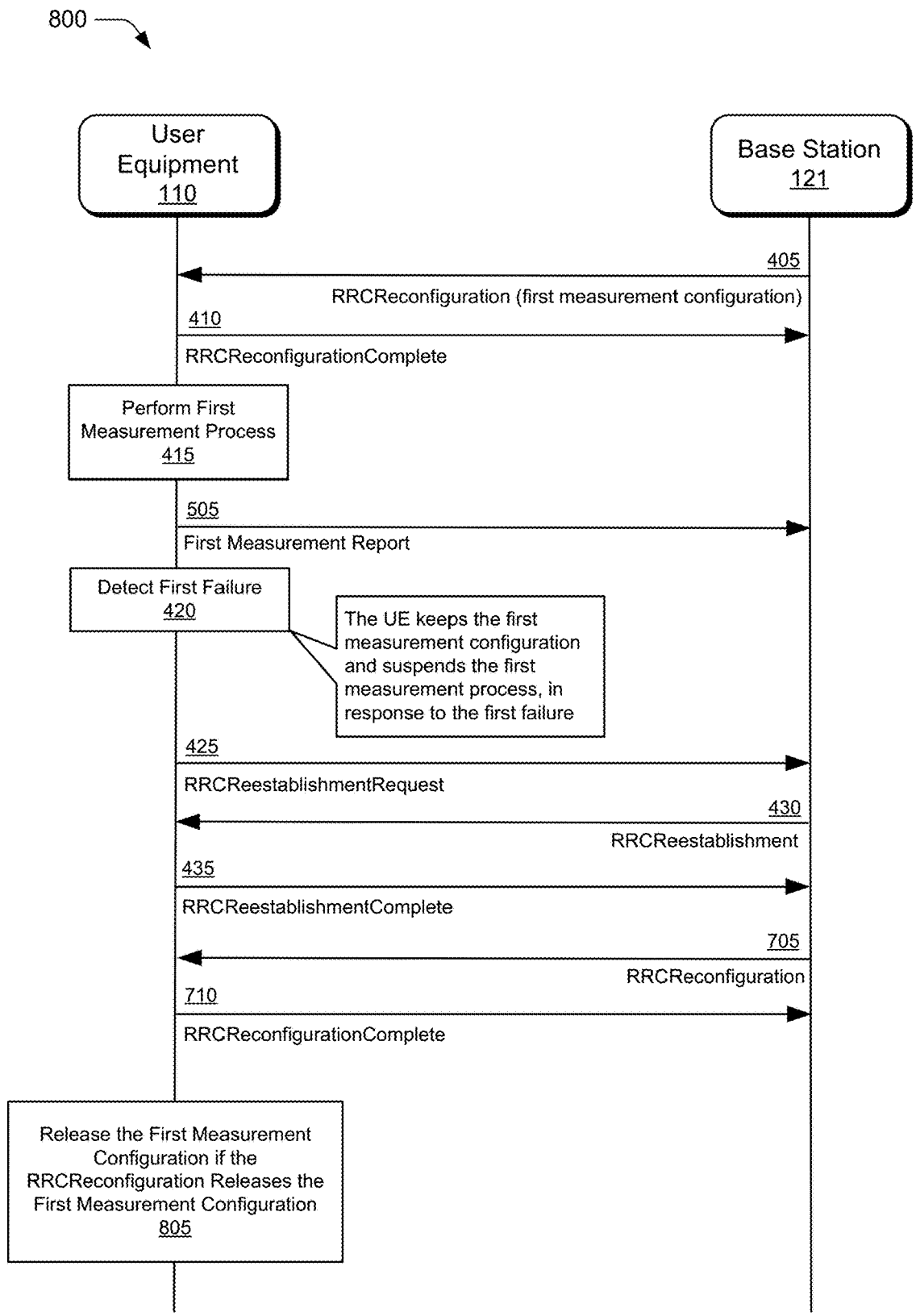
FIG. 8 illustrates example data and control transactions between devices engaged in radio resource control connection reestablishment in accordance with various aspects of the techniques described herein.

In another aspect, the UE 110 may determine to resume the first measurement or not resume the first measurement after receiving an RRC Reconfiguration message from the base station 121 after the RRC Reestablishment message. For example, the UE may resume the first measurement process if the RRC Reconfiguration message does not configure the UE to release the first measurement configuration as shown in FIG. 7. The UE keeps suspending or stops the first measurement process if the RRC Reconfiguration message configures the UE to release the first measurement configuration as shown in FIG. 8.

The UE may have stored a measurement result which has not be transmitted to the first base station when detecting the first communication failure. The UE may discard the measurement result in response to the first communication failure.

Figure 5:
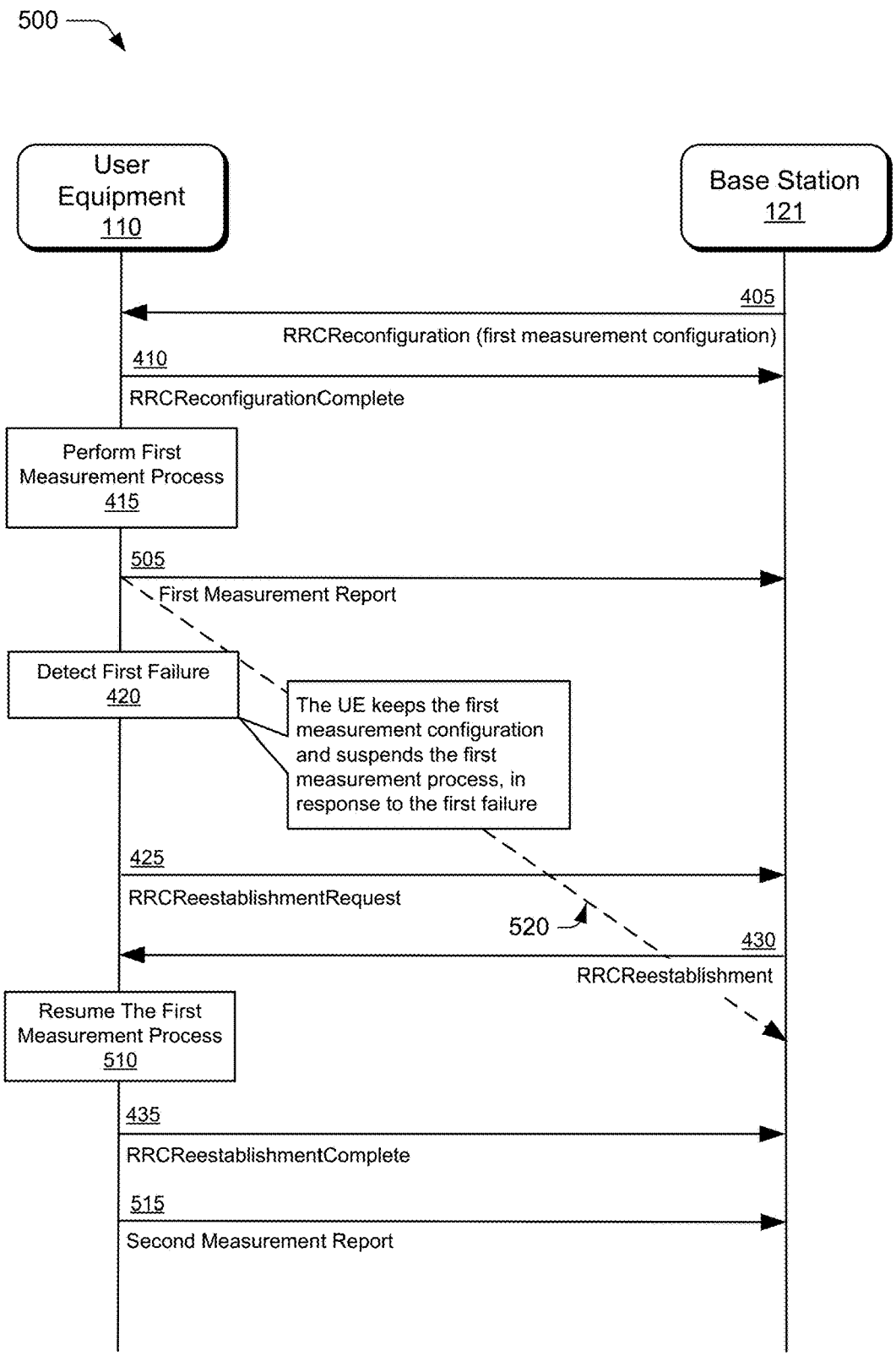
FIG. 5 illustrates example data and control transactions between devices engaged in radio resource control connection reestablishment in accordance with various aspects of the techniques described herein.

In accordance with the example shown in FIG. 5, before detecting the first communication failure at 420, the UE 110 may complete a round of the first measurement process and transmit, at 505, a first measurement report to the base station 121 according to the first measurement configuration. The first measurement report includes a first measurement result measured by the UE on the first measurement object. The first measurement report may include the first measurement identity. The first measurement object may include an absolute radio frequency channel number (ARFCN) and a reference signal to be measured.

When the UE 110 resumes the first measurement process as shown in FIGS. 5 and 6, the UE 110 may transmit, at 515, a second measurement report to the base station 121 according to the first measurement configuration as shown in FIGS. 5 and 6. The second measurement report includes a second measurement result measured by the UE on the first measurement object. The second measurement report may include the first measurement identity. The UE may determine to transmit the second measurement report after receiving the RRC Reestablishment message (as shown in FIG. 5) or after transmitting the RRC Reestablishment Complete message (as shown in FIG. 6) in order not to interfere with the base station 121 processing the messages of the RRC connection reestablishment procedure.

When the UE 110 detects the first communication failure or initiates the first RRC connection reestablishment procedure, the UE may perform a cell search to find a suitable cell to transmit the RRC Reestablishment Request. The UE may interrupt or suspend the cell search to perform the first measurement. As a result, the UE may fail the RRC connection reestablishment procedure due to performing the first measurement process. Because the UE suspends the first measurement process at 420, the UE performs the cell search more efficiently to recover the first communication failure.

After the UE transmits the RRC Reestablishment Request message, if the UE uses gap(s) to perform the first measurement (e.g., inter-frequency measurement), the UE may miss receiving the RRC Reestablishment message in the gap(s). As a result, the UE may fail the RRC connection reestablishment procedure due to performing the first measurement process. Because the UE suspends the first measurement process at 420, the UE does not miss receiving the RRC Reestablishment message in the gap(s).

In one aspect, the UE 110 may receive a first measurement gap configuration associated with the first measurement configuration if the UE needs gap(s) to perform the first measurement process. The UE performs the first measurement process using gap(s) configured by the first measurement gap configuration before detecting the first communication failure. The UE keeps the first measurement gap configuration in response to the first communication failure. When recovering the first communication failure, the UE performs/resumes the first measurement process using the first measurement gap configuration.

In another aspect, the UE may receive a second measurement configuration from a second base station (e.g., the base station 122 or the base station 123). The UE performs a second measurement according to the second measurement configuration. The UE detects a second communication failure with the second base station. The second communication failure may include any of the communication failures as described previously. The UE releases the second measurement configuration in response to the second communication failure. The second measurement configuration may comprise a second measurement identity. The UE may release the second measurement identity when releasing the measurement configuration. After the UE releases the second measurement configuration, the UE may not perform the second measurement process or may perform the second measurement process less frequently than before releasing the second measurement configuration. After the UE releases the second measurement configuration, the UE does not send any measurement report associated to the second measurement configuration. The first base station and the second base station may use different radio access technologies (RATs). For example, the first base station may be a 5G NR base station (e.g., gNB) and the second base station may be an E-UTRA base station (e.g., eNB or ng-eNB). The UE determines to keep or release a measurement configuration according to a specific radio access technology (RAT) (e.g., 5G NR or E-UTRA) where the UE receives the measurement configuration.

In one example, the UE may receive a second measurement gap configuration associated to the second measurement configuration if the UE needs gap(s) to perform the second measurement process. The UE performs the second measurement process using gap(s) configured by the second measurement gap configuration before detecting the second communication failure. The UE releases the second measurement gap configuration in response to the second communication failure.

The UE may receive a third measurement configuration from the first base station before detecting the first communication failure. The UE performs the third measurement process according to the third measurement configuration before detecting the first communication failure. In one example, any of the first, second, and third measurement configurations include an intra-frequency measurement configuration, an inter-frequency measurement configuration, or an inter-RAT measurement configuration.

In one aspect, the UE 110 keeps the third measurement configuration and suspends the third measurement process, in response to the first communication failure as described for the first measurement configuration above. In another example, the UE may determine to suspend the first measurement process and the third measurement process irrespective of the type of the first measurement configuration and the type of the third measurement configuration.

In a further aspect, the UE 110 keeps the third measurement configuration and suspends the third measurement process, in response to the first communication failure. In a first example, the UE may determine to suspend or not to suspend measurement depending on a type of the measurement configuration. In a second example, the UE does not suspend the third measurement process if the third measurement configuration is an intra-frequency measurement configuration. In a third example, the UE suspends the first measurement process if the first measurement configuration is an inter-frequency measurement configuration or an inter-RAT measurement configuration.

In a further aspect, the UE 110 may determine to keep or release a measurement configuration depending on a type of the measurement configuration. For example, the UE releases the third measurement configuration if the third measurement configuration is an inter-RAT measurement configuration. The UE keeps the first measurement configuration if the first measurement configuration is an intra-frequency measurement configuration.

In accordance with another aspect shown in FIG. 5, the base station 121 receives an RRC Reestablishment Request message from a UE to recover a communication failure at 425. At 430 in response to the RRC Reestablishment Request message, the base station transmits an RRC Reestablishment message to the UE.

As illustrated by the dashed line at 520, the base station receives a first measurement report from the UE after receiving the RRC Reestablishment Request message and before receiving an RRC Reestablishment Complete message from the UE. Note that the UE 110 may send the first measurement report prior to the UE 110 detecting the first communication failure but received by the base station 121 afterwards due to issues as reflected in the communication failure detection. The base station ignores the first measurement report and proceeds with an RRC connection reestablishment procedure triggered by the RRC Reestablishment Request message 425.

When the base station ignores the first measurement report, the base station may not perform an action for the UE in response to the first measurement report. For example, the action may be a handover. Thus, the base station can proceed with the RRC connection reestablishment procedure to recover the communication failure without being interrupted by the action triggered by the first measurement report. In other words, the base station stops the action if the action collides with the RRC connection reestablishment procedure. In one example, the base station may perform the action when/after the base station completes the RRC connection reestablishment procedure with the UE.

In one aspect, the base station receives an RRC Reestablishment Complete message responding to the RRC Reestablishment message, from the UE. If the base station receives the first measurement report from the UE after receiving the RRC Reestablishment Request message and before transmitting the RRC Reestablishment Complete message, the base station ignores the first measurement report. If the base station receives the first measurement report from the UE after transmitting the RRC Reestablishment message and before receiving the RRC Reestablishment Complete message, the base station ignores the first measurement report.

In another aspect, the base station may receive a second measurement report (at 515) from the UE after receiving the RRC Reestablishment Complete message at 435. The base station may perform the action for the UE in response to the second measurement report.

In a further aspect, the base station may receive a third measurement report from the UE after transmitting an RRC Reconfiguration message to the UE, when the base station transmits the RRC Reconfiguration message after transmitting the RRC Reestablishment message or receiving the RRC Reestablishment Complete message. The base station may perform the action for the UE in response to the third measurement report.

In another aspect, the base station may receive a fourth measurement report from the UE after receiving the RRC Reestablishment Complete message and before transmitting the RRC Reconfiguration. The base station may ignore the fourth measurement report as described for the first measurement report.

Figure 9:
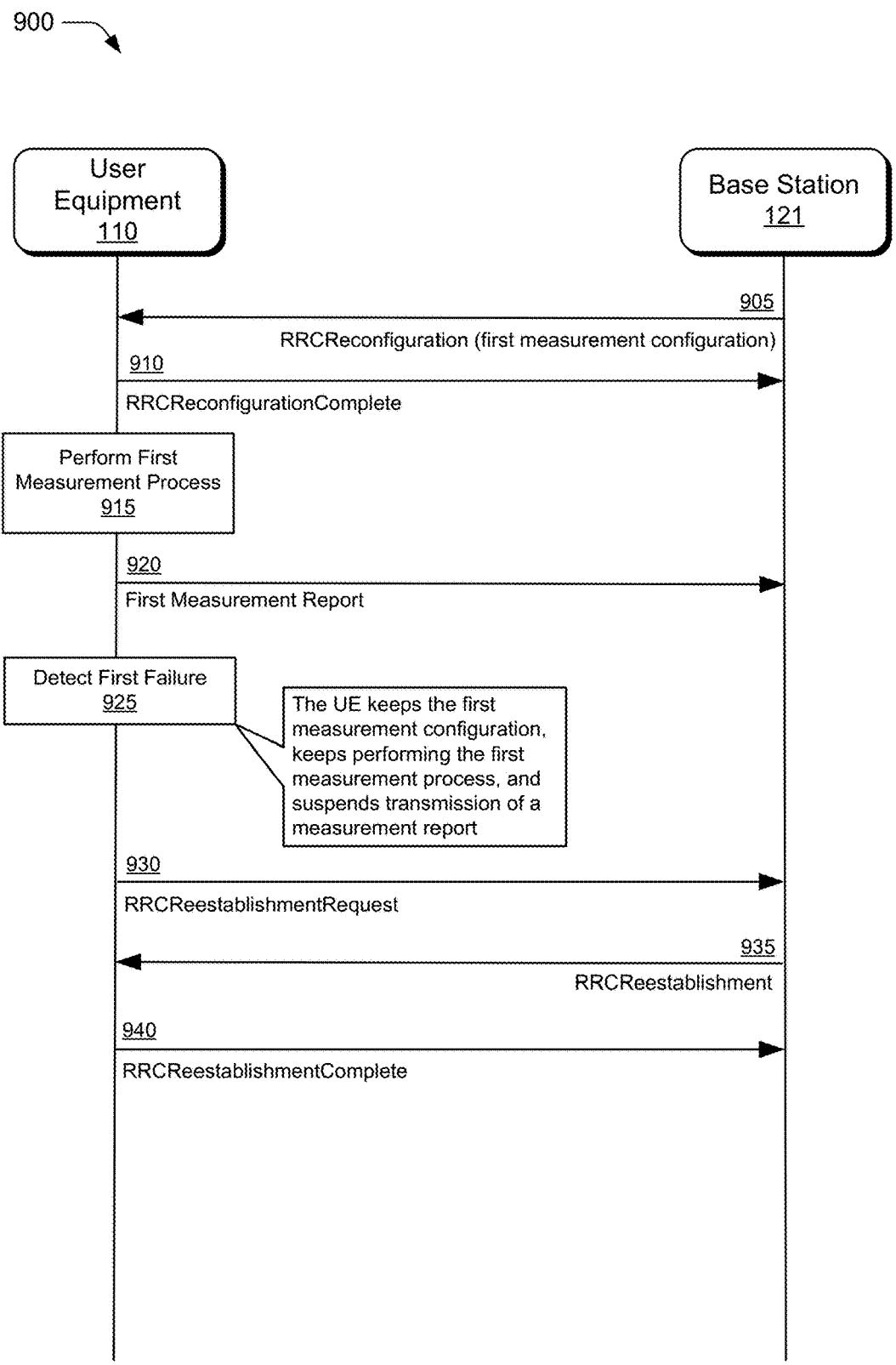
FIG. 9 illustrates example data and control transactions between devices engaged in radio resource control connection reestablishment in accordance with various aspects of the techniques described herein.
Figure 10:
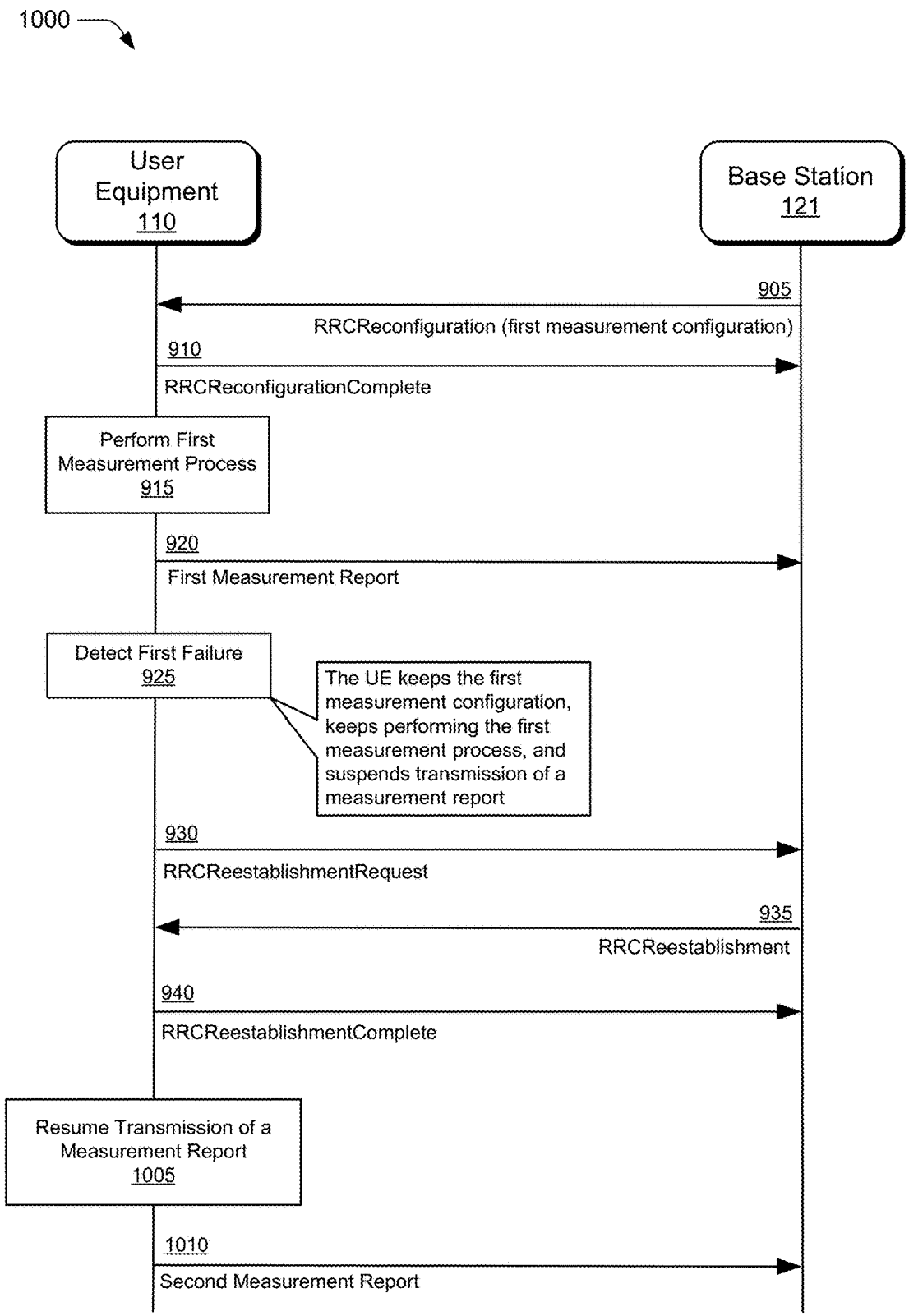
FIG. 10 illustrates example data and control transactions between devices engaged in radio resource control connection reestablishment in accordance with various aspects of the techniques described herein.

FIGS. 9 and 10 illustrate example data and control transactions between devices engaged in radio resource control connection reestablishment in accordance with various aspects of the techniques described herein. At 905, a UE (e.g., the UE 110) receives a first measurement configuration from a base station (e.g., the base station 121). For example, the UE 110 receives, from base station 121, a first RRC Reconfiguration message (e.g., an RRCReconfiguration message) that includes the first measurement configuration. In response to receiving the first RRCReconfiguration message, the UE 110 transmits a first RRC Reconfiguration Complete message (e.g., an RRCReconfigurationComplete message) to the base station 121 at 910. The first measurement configuration may configure a first measurement object to be measured. The first measurement configuration may include a first measurement identity identifying the first measurement configuration. The first measurement configuration may include a measurement reporting configuration.

At 915, the UE 110 performs a first measurement process according to the first measurement configuration. At 920, the UE 110 may complete a round of the first measurement process and transmit a first measurement report to the base station 121 according to the first measurement configuration. The first measurement report includes a first measurement result measured by the UE on the first measurement object. The first measurement report may include the first measurement identity. The first measurement object may include an absolute radio frequency channel number (ARFCN) and a reference signal to be measured.

At 925, the UE 110 detects a first communication failure in communications with the base station 121. In response to detecting the first communication failure, the UE 110 keeps (maintains) the first measurement configuration, continues to perform the first measurement process, and suspends transmission of the first measurement report. The first communication failure may include a radio link failure, a reconfiguration with sync failure, a mobility from 5G NR failure, an integrity check failure, a Radio Resource Control (RRC) connection reconfiguration failure, or the like. In response to detecting the communication failure, the UE 110 initiates a first RRC connection reestablishment procedure, at 930, by transmitting an RRC reestablishment request message (e.g., an RRCReestablishmentRequest message) to the base station 121.

In addition to the measurement report, the UE may suspend transmission of an RRC message in response to the first communication failure. For example, the RRC message may be a Location Measurement Indication message.

The UE may trigger to report a measurement result according to the first measurement process and a reporting configuration in first measurement configuration, during a time period of suspending the measurement report. The UE suspends transmission of a measurement reporting, including the measurement result, during the time period.

At 1005, the UE may resume transmission of the measurement report when recovering the first communication failure as described above and with reference to FIG. 10. For example, at 1010, the UE may transmit a second measurement report according to the first measurement configuration to the base station after recovering the first communication failure. The first and second measurement reports include the same measurement identity.

Without suspending the transmission of the measurement report, the UE 110 may transmit a measurement report before/during receiving the RRC Reestablishment message at 935, due to an event triggered before/during receiving the RRC Reestablishment message (e.g., an RRCReestablishment message). The base station may not be able to process the measurement report since the base station expects to receive the RRC Reestablishment Complete message (e.g., an RRCReestablishmentComplete message), at 940. By the UE suspending transmission of the measurement report, the base station can correctly handle the RRC connection reestablishment procedure with the UE.

Examples associated with the processes illustrated with respect to FIGS. 4-8 are applicable to the processes illustrated with respect to FIGS. 9 and 10.

Figure 11:
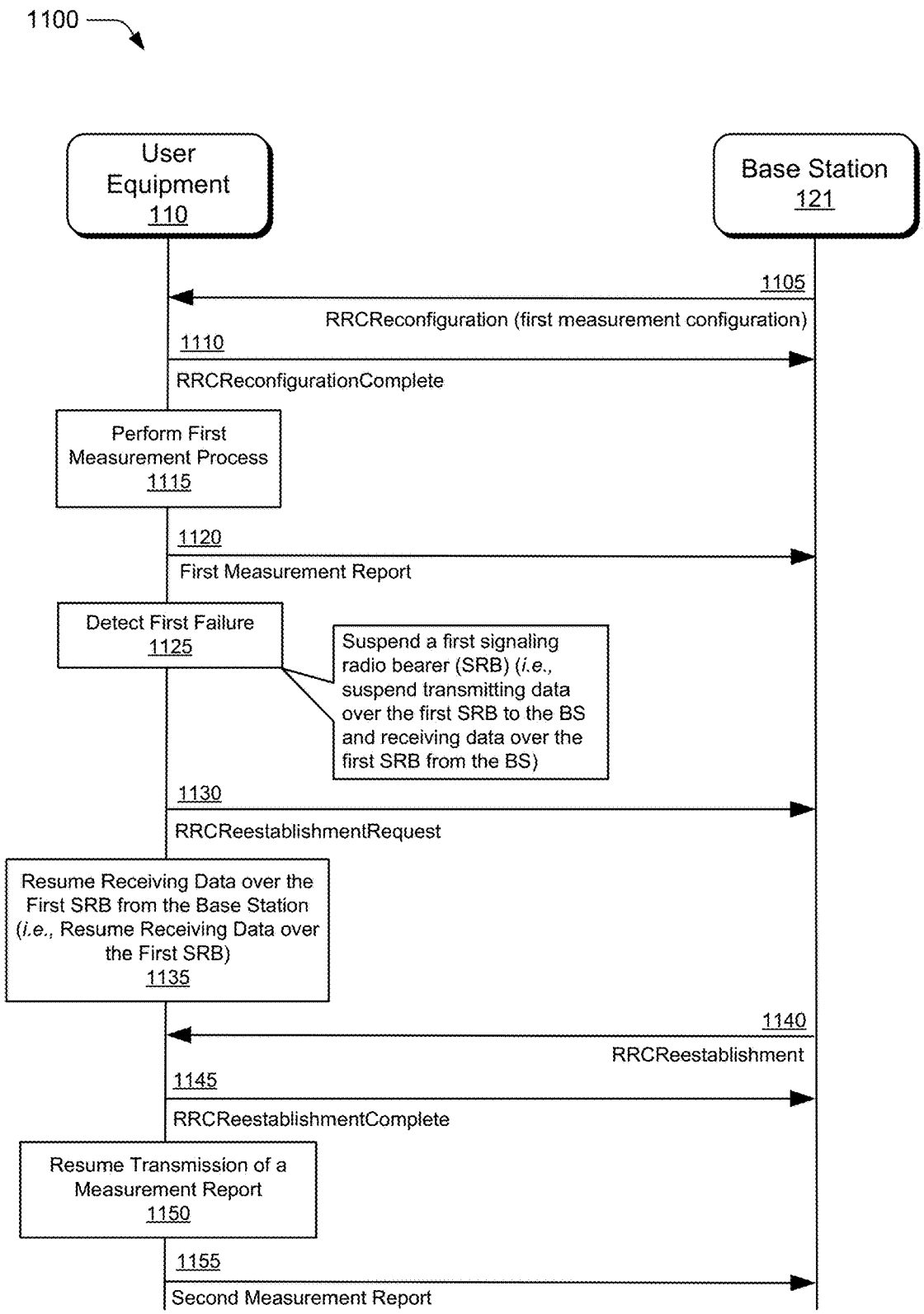
FIG. 11 illustrates example data and control transactions between devices engaged in radio resource control connection reestablishment in accordance with various aspects of the techniques described herein.

FIG. 11 illustrates example data and control transactions between devices engaged in radio resource control connection reestablishment in accordance with various aspects of the techniques described herein. At 1105, a UE (e.g., the UE 110) receives a first measurement configuration from a base station (e.g., the base station 121). For example, the UE 110 receives, from base station 121, a first RRC Reconfiguration message (e.g., an RRCReconfiguration message) that includes the first measurement configuration. In response to receiving the first RRCReconfiguration message the UE 110 transmits a first RRC Reconfiguration Complete message (e.g., an RRCReconfigurationComplete message) message to the base station 121, at 1110. The first measurement configuration may configure a first measurement object to be measured. The first measurement configuration may configure a first measurement identity identifying the first measurement configuration. The first measurement configuration may configure a measurement reporting configuration.

At 1115, the UE 110 performs a first measurement process according to the first measurement configuration. At 1120, the UE 110 may complete a round of the first measurement process and transmit a first measurement report to the base station 121 according to the first measurement configuration. The first measurement report includes a first measurement result measured by the UE on the first measurement object. The first measurement report may include the first measurement identity. The first measurement object may include an absolute radio frequency channel number (ARFCN) and a reference signal to be measured.

At 1125, the UE 110 detects a first communication failure in communications with the base station 121. In response to detecting the first communication failure, the UE 110 suspends a first signaling radio bearer (SRB) (e.g., suspends transmitting data over the first SRB to the base station and receiving data over the first SRB from the base station) in response to the communication failure. In one example, the first SRB is SRB1.

At 1130, in response to detecting the communication failure, the UE 110 initiates a first RRC connection reestablishment procedure by transmitting an RRC reestablishment request message (e.g., an RRCReestablishmentRequest message) to the base station 121. At 1135, in response to transmitting the RRC Reestablishment Request message, the UE resumes receiving data over the first SRB from the base station.

At 1140, the UE receives an RRC Reestablishment message (e.g., an RRCReestablishment message) in response to the RRCReestablishmentRequest message, on the first SRB from the base station. At 1145, in response to receiving the RRCReestablishment message, the UE 110 transmits an RRC Reestablishment Complete message (e.g., RRCReestablishmentComplete message). At 1150, the UE resumes the process to transmit measurement reports, and at 1155, the UE transmits a second measurement report to the base station.

In one example, when the UE suspends transmitting data over the first SRB, the UE may stop generating or stop processing data associated to the first SRB to be transmitted or received. Thus, no data associated to the first SRB is transmitted by the UE to the base station. For example, the UE may not generate or process data (e.g., the measurement report) associated with the first SRB. In one alternative, the UE does not suspend receiving data over the first SRB in response to the communication failure.

The UE may transmit the RRC Reestablishment Request message on a second SRB. The UE does not suspend the second SRB in response to detecting the communication failure at 1125. In one example, the second SRB is SRB0.

The UE may suspend a third SRB in response to the communication failure. In one example, the third SRB is SRB2. The UE may suspend data radio bearer(s) (DRB(s)) configured to the UE in response to detecting the communication failure at 1125.

By suspending transmitting data over the first SRB, the UE does not transmit data (e.g., the measurement report) during the RRC connection reestablishment procedure. Suspending these transmissions avoids the issues with reestablishment discussed above with reference to FIGS. 4-8.

The data above may comprise a protocol data unit (PDU) associated to the first SRB or a logical channel associated to the first SRB.

Examples associated with the processes illustrated with respect to FIGS. 4-8 are applicable to the process illustrated with respect to FIG. 11.

The following examples may be applied to any of the processes illustrated in FIGS. 4-11, above. The UE may suspend a signaling radio bearer (SRB) (e.g., SRB1) used to exchange RRC messages with the base station and suspend a data radio bearer (DRB) used to transmit and/or receive data in response to the communication failure or the RRC connection reestablishment procedure. The UE may resume the SRB when transmitting the RRC Reestablishment Request message. The UE may resume the DRB when receiving an RRC Reconfiguration message following the RRC Reestablishment message. However, the base station may not suspend the SRB and/or may suspend the DRB, in response to the RRC Reestablishment Request message. In one example, the base station may suspend transmission of an RRC message other than the RRC Reestablishment message in response to the RRC Reestablishment Request message. The base station resumes the transmission of the RRC message when transmitting the RRC Reestablishment message. The base station resumes the DRB when/after transmitting the Reconfiguration message or receiving an RRC Reconfiguration Complete message responding to the RRC Reconfiguration message. In an alternative example, the base station prioritizes transmission of the RRC Reestablishment message in a higher priority than transmission of the RRC message.

Example Methods

Example methods 1200-1400 are described with reference to FIGS. 12, 13, and 14 in accordance with one or more aspects of radio resource control connection reestablishment. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 12:
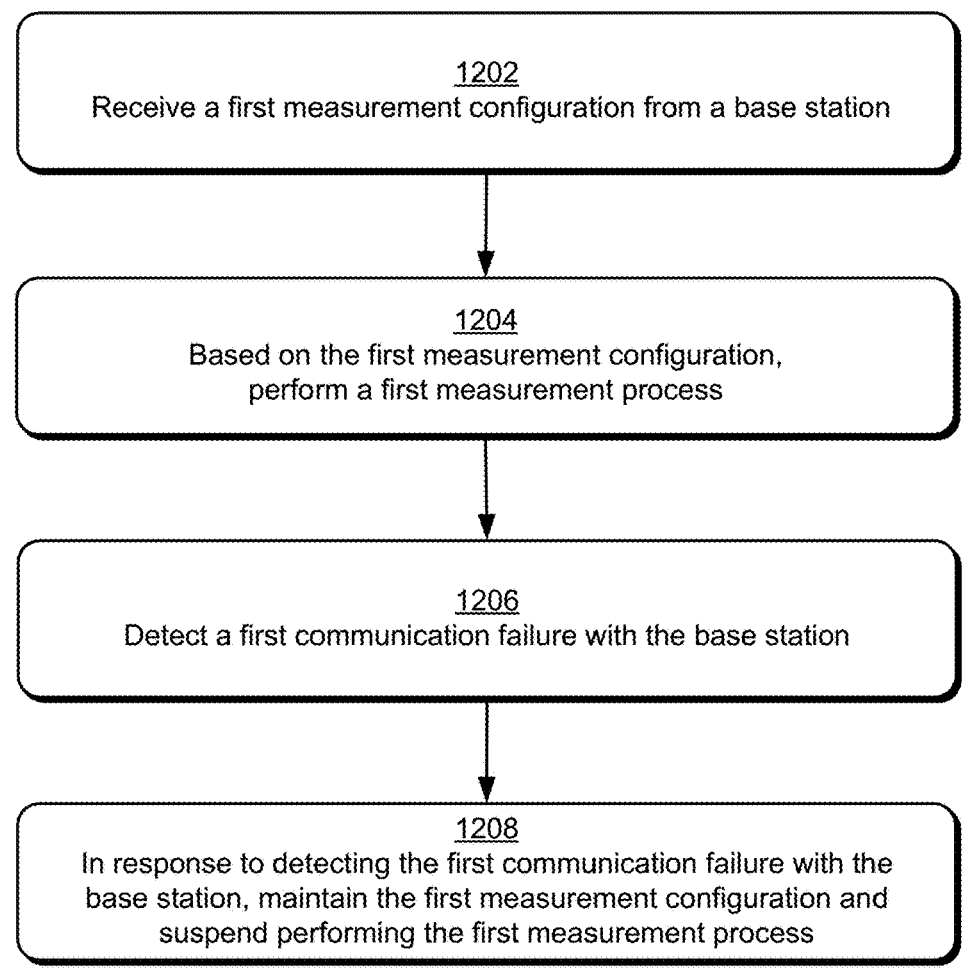
FIG. 12 illustrates an example method of radio resource control connection reestablishment as generally related to a user equipment in accordance with aspects of the techniques described herein.

FIG. 12 illustrates example method(s) 1200 of radio resource control connection reestablishment as generally related to a user equipment as illustrated in FIGS. 4-8. At 1202, a user equipment receives a first measurement configuration from a base station. For example, a user equipment (e.g., the UE 110) receives a first measurement configuration (e.g., the RRCReconfiguration message 405 including the first measurement configuration) from a base station (e.g., the base station 121). The first measurement configuration may include a first measurement object to be measured, a first measurement identity identifying the first measurement configuration, a measurement reporting configuration, and/or an absolute radio frequency channel number (ARFCN) and a reference signal to be measured.

At 1204, based on the first measurement configuration, the user equipment performs a first measurement process. For example, the user equipment 110 (e.g., the measurement manager 216) performs a first measurement process (e.g., the first measurement process 415) based on the first measurement configuration.

At 1206, the user equipment detects a first communication failure with the base station. For example, the user equipment 113 detects a communication failure (e.g., first failure 420) of a wireless communication link (e.g., the wireless communication link 131) with the base station 121.

At 1208, in response to detecting the first communication failure with the base station, the user equipment maintains the first measurement configuration and suspends performing the first measurement process. For example, the user equipment 110 maintains the first measurement configuration (e.g., storing the first measurement configuration in the CRM 212) and suspends performing the first measurement process 415.

Figure 13:
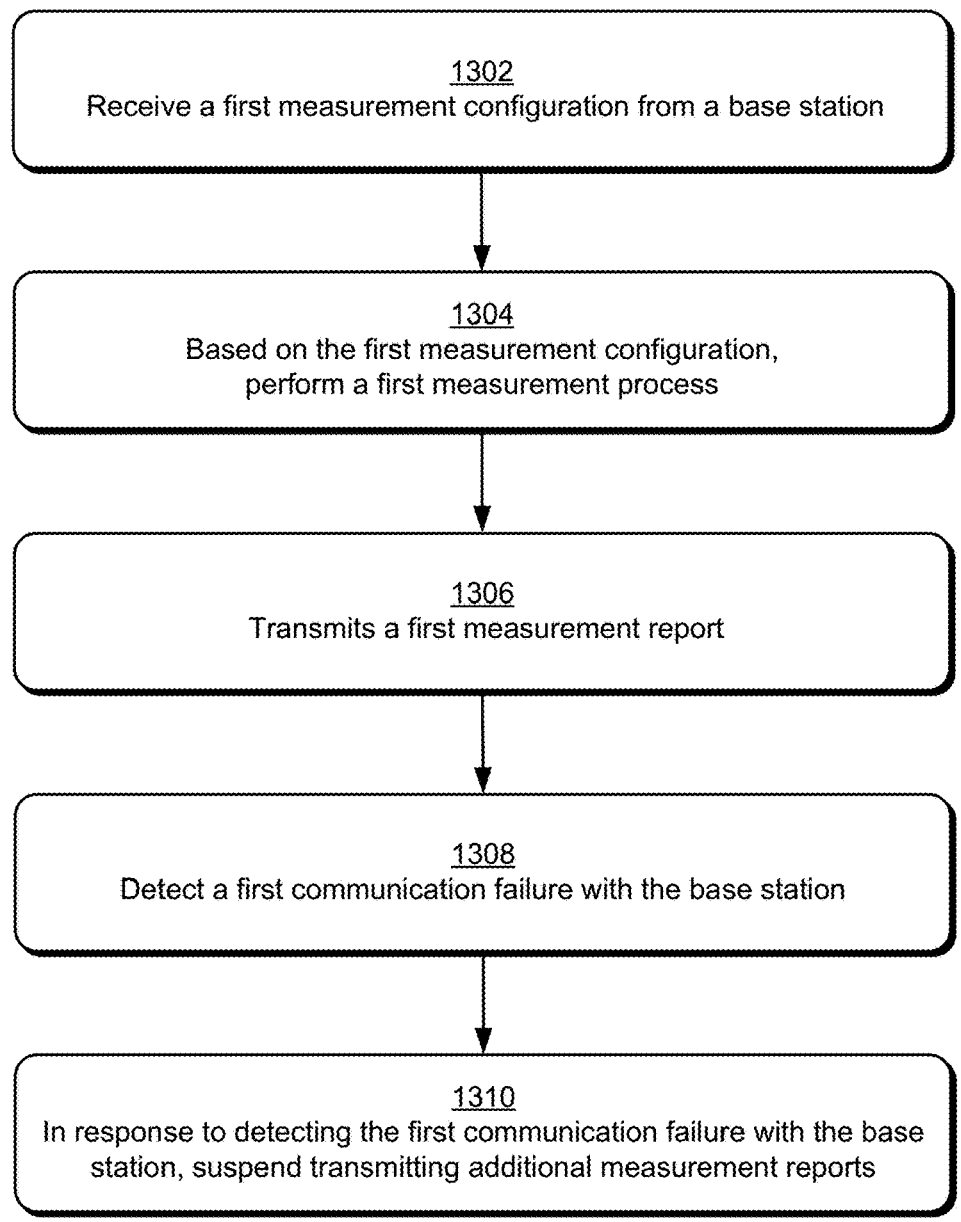
FIG. 13 illustrates an example method of radio resource control connection reestablishment as generally related to a user equipment in accordance with aspects of the techniques described herein.

FIG. 13 illustrates example method(s) 1300 of radio resource control connection reestablishment as generally related to a user equipment as illustrated in FIGS. 9 and 10. At 1302, a user equipment receives a first measurement configuration from a base station. For example, a user equipment (e.g., the UE 110) receives a first measurement configuration (e.g., the RRCReconfiguration message 405 including the first measurement configuration) from a base station (e.g., the base station 121). The first measurement configuration may include a first measurement object to be measured, a first measurement identity identifying the first measurement configuration, a measurement reporting configuration, and/or an absolute radio frequency channel number (ARFCN) and a reference signal to be measured.

At 1304, based on the first measurement configuration, the user equipment performs a first measurement process. For example, the user equipment 110 (e.g., the measurement manager 216) performs a first measurement process (e.g., the first measurement process 415) based on the first measurement configuration.

At 1306, the user equipment transmits a first measurement report. For example, the user equipment 113 transmits a first measurement report (e.g., the first measurement report 920) to the base station 121. The first measurement report can include a first measurement result measured on the first measurement object and/or the first measurement identity.

At 1308, the user equipment detects a first communication failure with the base station. For example, the user equipment 113 detects a communication failure (e.g., first failure 925) of a wireless communication link (e.g., the wireless communication link 131) with the base station 121.

At 1310, in response to detecting the first communication failure with the base station, the user equipment suspends transmitting additional measurement reports. For example, the user equipment 110 suspends transmitting additional measurement reports.

Figure 14:
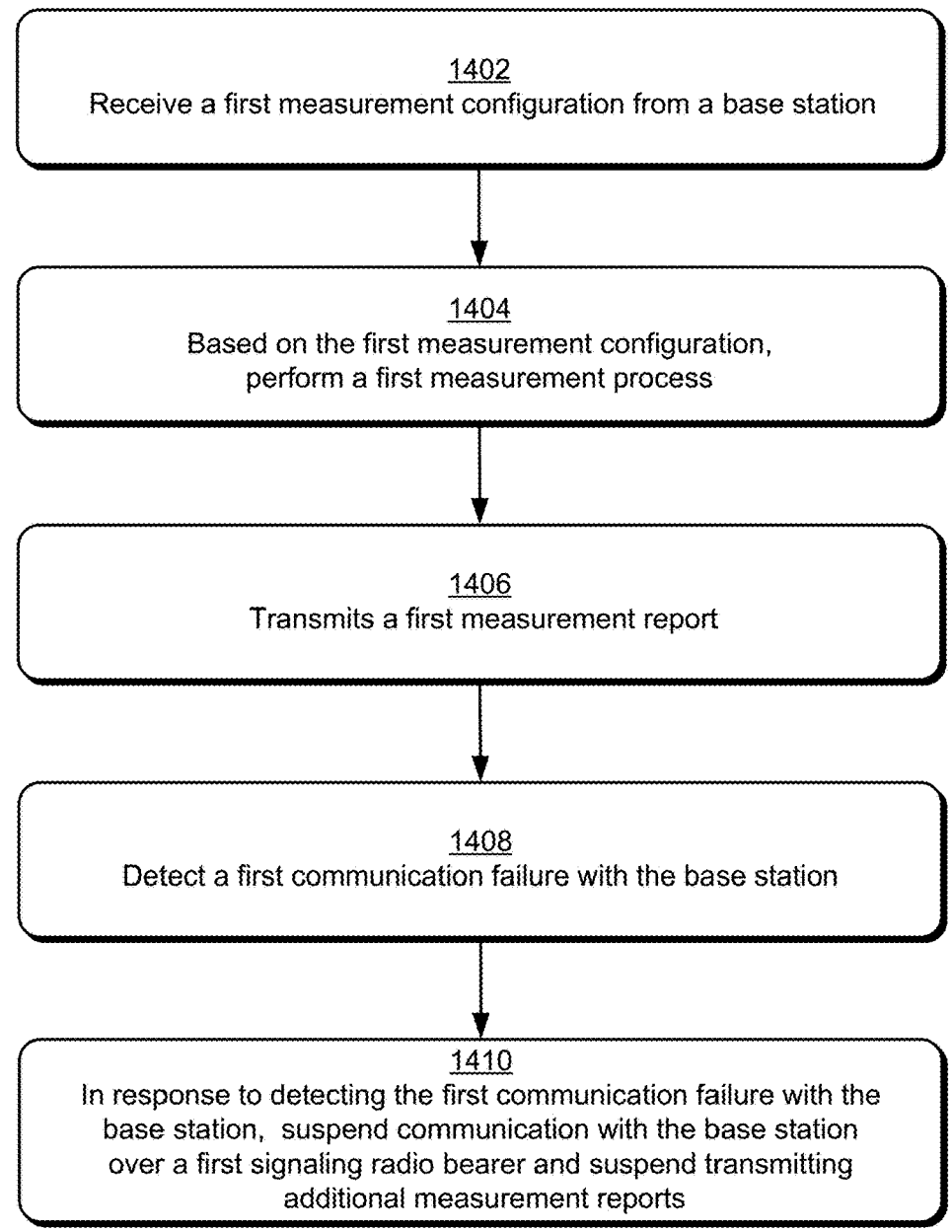
FIG. 14 illustrates an example method of radio resource control connection reestablishment as generally related to a user equipment in accordance with aspects of the techniques described herein.

FIG. 14 illustrates example method(s) 1400 of radio resource control connection reestablishment as generally related to a user equipment as illustrated in FIG. 11. At 1402, a user equipment receives a first measurement configuration from a base station. For example, a user equipment (e.g., the UE 110) receives a first measurement configuration (e.g., the RRCReconfiguration message 405 including the first measurement configuration) from a base station (e.g., the base station 121). The first measurement configuration may include a first measurement object to be measured, a first measurement identity identifying the first measurement configuration, a measurement reporting configuration, and/or an absolute radio frequency channel number (ARFCN) and a reference signal to be measured.

At 1404, based on the first measurement configuration, the user equipment performs a first measurement process. For example, the user equipment 110 (e.g., the measurement manager 216) performs a first measurement process (e.g., the first measurement process 415) based on the first measurement configuration.

At 1406, the user equipment transmits a first measurement report. For example, the user equipment 113 transmits a first measurement report (e.g., the first measurement report 920) to the base station 121. The first measurement report can include a first measurement result measured on the first measurement object and/or the first measurement identity.

At 1408, the user equipment detects a first communication failure with the base station. For example, the user equipment 113 detects a communication failure (e.g., first failure 925) of a wireless communication link (e.g., the wireless communication link 131) with the base station 121.

At 1410, in response to detecting the first communication failure with the base station, the user equipment suspends communication with the base station over a first signaling radio bearer (SRB) and suspends transmitting additional measurement reports. For example, the user equipment 110 suspends communication with the base station 121 over the wireless communication link 131 and suspends transmitting additional measurement reports.

Although aspects of radio resource control connection reestablishment have been described in language specific to features and/or methods, the subject of the appended claims is not necessarily limited to the specific features or methods described. Rather, the specific features and methods are disclosed as example implementations of radio resource control connection reestablishment, and other equivalent features and methods are intended to be within the scope of the appended claims. Further, various different aspects are described, and it is to be appreciated that each described aspect can be implemented independently or in connection with one or more other described aspects.

CONCLUSION

Although aspects of radio resource control connection reestablishment have been described in language specific to features and/or methods, the subject of the appended claims is not necessarily limited to the specific features or methods described. Rather, the specific features and methods are disclosed as example implementations of radio resource control connection reestablishment, and other equivalent features and methods are intended to be within the scope of the appended claims. Further, various different aspects are described, and it is to be appreciated that each described aspect can be implemented independently or in connection with one or more other described aspects.

What is claimed is:

1. A method of reestablishing a radio resource control (RRC) connection, the method comprising a user equipment:
   receiving a first measurement configuration from a base station;
   based on the first measurement configuration, performing a first measurement process;
   detecting a first communication failure with the base station;
   in response to detecting the first communication failure with the base station:
   releasing a measurement gap configuration; and
   maintaining the first measurement configuration.

2. The method of claim 1, further comprising the user equipment:
   in response to detecting the first communication failure with the base station, transmitting an RRC Reestablishment Request message to the base station; and
   in response to the transmitting the RRC Reestablishment Request message, receiving an RRC Reestablishment message from the base station.

3. The method of claim 1, further comprising the user equipment:
   before the detecting the first communication failure with the base station, transmitting a first measurement report.

4. The method of claim 3, wherein the first measurement report includes one or more of:
   a first measurement result measured on a measurement object; or
   a first measurement identity that identifies the first measurement configuration.

5. The method of claim 1, further comprising the user equipment:
   in response to detecting the first communication failure with the base station, transmitting an RRC Reestablishment Request message to the base station;
   in response to the transmitting the RRC Reestablishment Request message, receiving an RRC Reestablishment message from the base station; and
   in response to the receiving the RRC Reestablishment message, resuming the performing the first measurement process.

6. The method of claim 5, further comprising the user equipment:
   in response to the receiving the RRC Reestablishment message, transmitting an RRC Reestablishment complete message before the resuming the first measurement process.

7. The method of claim 5, further comprising the user equipment:
   in response to the receiving the RRC Reestablishment message, transmitting an RRC Reestablishment complete message after the resuming the first measurement process.

8. The method of claim 5, further comprising the user equipment:
   transmitting a second measurement report.

9. The method of claim 1, further comprising the user equipment:
   receiving a second measurement configuration from the base station;
   determining if the second measurement configuration includes an indication to release the first measurement configuration; and
   based on determining that the second measurement configuration includes the indication to release the first measurement configuration, releasing the first measurement configuration; or
   based on determining that the second measurement configuration does not include the indication to release the first measurement configuration:
   maintaining the first measurement configuration; and
   resuming the performing the first measurement process.

10. The method of claim 1, wherein the first measurement configuration includes one or more of:
    a first measurement object to be measured;
    a first measurement identity identifying the first measurement configuration;
    a measurement reporting configuration; or
    an absolute radio frequency channel number (ARFCN) and a reference signal to be measured.

11. The method of claim 1, further comprising the user equipment:
    suspending the performing the first measurement process.

12. A user equipment comprising:
    a wireless transceiver; and
    a processor and memory system to implement a measurement manager application configured to:
    receive a first measurement configuration from a base station;
    based on the first measurement configuration, perform a first measurement process;
    detect a first communication failure with the base station;
    in response to detecting the first communication failure with the base station:
    release a measurement gap configuration; and
    maintain the first measurement configuration.

13. The user equipment of claim 12, wherein the measurement manager application is configured to:
    in response to the detection of the first communication failure with the base station, transmit an RRC Reestablishment Request message to the base station; and
    in response to the transmission of the RRC Reestablishment Request message, receive an RRC Reestablishment message from the base station.

14. The user equipment of claim 12, wherein the measurement manager application is configured to:
    before the detection of the first communication failure with the base station, transmit a first measurement report;

in response to the detection of the first communication failure with the base station, transmit an RRC Reestablishment Request message to the base station;

in response to the transmission of the RRC Reestablishment Request message, receive an RRC Reestablishment message from the base station; and in response to the reception of the RRC Reestablishment message, resume the performance of the first measurement process.

15. The user equipment of claim 14, wherein first measurement report includes one or more of:
   a first measurement result measured on a first measurement object; or
   a first measurement identity that identifies the first measurement configuration.

16. The user equipment of claim 12, wherein the measurement manager application is configured to:
   in response to the detection of the first communication failure with the base station:
      continue the performance of the first measurement process.

17. The user equipment of claim 12, wherein the first measurement configuration includes one or more of:
   a first measurement object to be measured;
   a first measurement identity identifying the first measurement configuration;
   a measurement reporting configuration; or
   an absolute radio frequency channel number (ARFCN) and a reference signal to be measured.

18. The user equipment of claim 12, wherein the measurement manager application is configured to:
   suspend the performance of the first measurement process.

19. A method of reestablishing a radio resource control (RRC) connection, the method comprising a user equipment:
   receiving a first measurement configuration from a base station;
   receiving a second measurement configuration from the base station;
   based on the first measurement configuration, performing a first measurement process;
   transmitting a first measurement report;
   detecting a first communication failure with the base station;
   in response to detecting the first communication failure with the base station:
      releasing the second measurement configuration;
      suspending communication with the base station over a first signaling radio bearer (SRB); and
      maintaining the first measurement configuration.

20. The method of claim 19, further comprising the user equipment:
   in response to detecting the first communication failure with the base station, transmitting an RRC Reestablishment Request message to the base station;
   in response to the transmitting the RRC Reestablishment Request message, receiving data over the first SRB from the base station;
   receiving an RRC Reestablishment message from the base station;
   in response to the receiving the RRC Reestablishment message, determining to resume the transmission of additional measurement reports; and
   transmitting a second measurement report.

21. The method of claim 19, wherein the first measurement configuration includes one or more of:
   a first measurement object to be measured;
   a first measurement identity identifying the first measurement configuration;
   a measurement reporting configuration; or
   an absolute radio frequency channel number (ARFCN) and a reference signal to be measured.

22. The method of claim 19, wherein the first measurement report includes one or more of:
   a first measurement result measured on a measurement object; or
   a first measurement identity that identifies the first measurement configuration.

23. The method of claim 19, further comprising the user equipment:
   in response to detecting the first communication failure with the base station:
   suspending transmission of additional measurement reports.

* * * * *